United States Patent
Campbell et al.

(10) Patent No.: US 8,316,446 B1
(45) Date of Patent: Nov. 20, 2012

(54) METHODS AND APPARATUS FOR BLOCKING UNWANTED SOFTWARE DOWNLOADS

(75) Inventors: Alexander Wade Campbell, Woodinville, WA (US); Lee Thomas Dolsen, Los Gatos, CA (US); Vilis Ositis, Sunol, CA (US); Cameron Charles Smith, Redwood City, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1122 days.

(21) Appl. No.: 11/112,033

(22) Filed: Apr. 22, 2005

(51) Int. Cl.
*G06F 11/00* (2006.01)

(52) U.S. Cl. ............ 726/24; 709/225; 709/229; 726/25; 726/22; 713/154; 713/188; 380/201

(58) Field of Classification Search .................. 713/188, 713/154; 726/24, 22, 25; 709/225, 229; 380/201
See application file for complete search history.

(56) References Cited

U.S. PATENT DOCUMENTS

| | | | |
|---|---|---|---|
| 5,884,033 A * | 3/1999 | Duvall et al. ................ | 709/206 |
| 6,321,267 B1 * | 11/2001 | Donaldson .................... | 709/229 |
| 6,374,290 B1 | 4/2002 | Scharber et al. | |
| 6,499,109 B1 * | 12/2002 | Balasubramaniam et al. . | 726/22 |
| 6,640,307 B2 * | 10/2003 | Viets et al. ....................... | 726/15 |
| 6,701,441 B1 * | 3/2004 | Balasubramaniam et al. . | 726/25 |
| 6,917,972 B1 * | 7/2005 | Basko et al. ................... | 709/224 |
| 7,249,196 B1 | 7/2007 | Peiffer et al. | |
| 7,275,086 B1 | 9/2007 | Bodnar | |
| 7,308,256 B2 * | 12/2007 | Morota et al. ................ | 455/418 |
| 7,395,498 B2 | 7/2008 | Katayama et al. | |
| 7,441,273 B2 * | 10/2008 | Edwards et al. ................ | 726/24 |
| 7,490,350 B1 * | 2/2009 | Murotake et al. ............... | 726/11 |
| 7,765,592 B2 * | 7/2010 | Wang et al. ..................... | 726/22 |
| 2002/0004908 A1 | 1/2002 | Galea | |
| 2004/0006621 A1 * | 1/2004 | Bellinson et al. ............. | 709/225 |
| 2004/0073903 A1 * | 4/2004 | Melchione et al. ........... | 717/172 |
| 2004/0127195 A1 * | 7/2004 | An ................................ | 455/410 |
| 2004/0267929 A1 * | 12/2004 | Xie ................................ | 709/225 |
| 2005/0005099 A1 * | 1/2005 | Naruse et al. ................. | 713/161 |
| 2005/0044541 A1 * | 2/2005 | Parthasarathy et al. ....... | 717/173 |
| 2005/0050334 A1 * | 3/2005 | Liang et al. ................... | 713/188 |
| 2005/0066061 A1 * | 3/2005 | Graves et al. ................. | 709/249 |
| 2005/0138395 A1 * | 6/2005 | Benco et al. .................. | 713/188 |
| 2005/0144297 A1 * | 6/2005 | Dahlstrom et al. ........... | 709/229 |
| 2005/0235030 A1 * | 10/2005 | Lauckhart et al. ............ | 709/200 |
| 2005/0268112 A1 * | 12/2005 | Wang et al. .................... | 713/188 |
| 2006/0005148 A1 * | 1/2006 | Cheng et al. .................. | 715/808 |
| 2006/0015939 A1 * | 1/2006 | Aston et al. ..................... | 726/22 |
| 2006/0047729 A1 * | 3/2006 | Yuan et al. .................... | 707/205 |
| 2006/0075499 A1 * | 4/2006 | Edwards et al. ................ | 726/24 |
| 2007/0083810 A1 | 4/2007 | Scott et al. | |
| 2007/0261051 A1 * | 11/2007 | Porter et al. .................. | 717/174 |

OTHER PUBLICATIONS

Non Final Office Action dated May 27, 2010, from U.S. Appl. No. 12/363,696, filed Jan. 30, 2009, 21 pages.

(Continued)

*Primary Examiner* — April Shan
(74) *Attorney, Agent, or Firm* — Tarek N. Fahmi, APC

(57) ABSTRACT

Methods and systems for blocking unwanted software downloads within a network. Such methods may thereby prevent (i) downloads of spyware from one or more identified locations, and/or (ii) certain outbound communications from the network and/or may also permit software downloads only from specified locations. In general, the policies are defined by rules specified by a network administrator or other user.

10 Claims, 3 Drawing Sheets

OTHER PUBLICATIONS

Response to Office Action filed on Aug. 26, 2010 in U.S. Appl. No. 12/363,696, filed Jan. 30, 2009. (in response to Office Action mailed on May 27, 2010).

http://www.spyware-experts.com/spyware-vs-virus/; 3pp; Mar. 14, 2011.

http://www.squidoo.com/spyware-vs-virus; 7pp; Mar. 14, 2011.

* cited by examiner

METHODS AND APPARATUS FOR BLOCKING UNWANTED SOFTWARE DOWNLOADS

FIELD OF THE INVENTION

The present invention relates to methods and apparatus for blocking unwanted software downloads, for example at gateways to enterprise or home networks.

BACKGROUND

The Internet is a vast and expanding network of networks of computers and other devices linked together by various telecommunications media, enabling all of these computers and other devices to exchange and share data. Sites on the Internet provide information about a myriad of corporations and products, as well as educational, research and entertainment information and services.

While connecting a personal computer (PC) to the Internet is greatly beneficial, there are also associated dangers and risks. One well known risk is the threat of computer viruses such as worms that spread from computer to computer using e-mail. Another threat to computer and data safety is spyware and Trojans. Spyware is malicious code that covertly monitors actions taken on a PC, and reports those activities to an outside entity. For example, spyware can log and report all websites visited by a user, along with other personal data such as passwords, bank accounts, social security numbers, and so on.

Similarly, Trojans—also known as Trojan horses—are programs that appear legitimate, but perform some illicit activity when executed. It may be used to locate password information or make the system more vulnerable to future entry or simply destroy programs or data on the hard disk. A Trojan stays in the computer doing its damage or allowing somebody from a remote site to take control of the computer. Trojans often sneak in attached to a free game or other utility. There are also other kinds of unwanted software that may be harmful to the operation of a host machine.

What is needed is a comprehensive system to block unwanted software downloads and installations.

SUMMARY OF THE INVENTION

In one embodiment, the present invention provides methods for establishing and then implementing one or more policies to prevent spyware from interfering with a host within a network. Such policies may thereby prevent (i) downloads of spyware from one or more identified locations, and/or (ii) certain outbound communications from the network. The policies may also permit software downloads only from specified locations. In general, the policies are defined by rules specified by a network administrator or other user.

In a further embodiment of the present invention a network gateway is configured with one or more rules regarding handling of spyware, so as to afford protection for an associated network communicatively coupled to the Internet via the network gateway by automatically implementing the rules to prevent downloads of spyware. The gateway may also be configured to (i) prevent spyware initiated outbound communications from the network and/or (ii) filter information from one or more Internet hosts according to a blacklist and/or whitelist of prohibited sites. Upon detection of spyware initiated outbound communications from the network the gateway may be configured to activate (either automatically or with user consent) a spyware cleanser.

Still another embodiment of the present invention provides a proxy server that includes a spyware policy database configured to store user-defined spyware policies for handling of communications passing through the proxy server, a spyware policy editor configured to provide a user interface adapted to allow an administrator to create or edit the user-defined policies to be stored in the spyware policy database, and one or more modules configured to scan the communications passing through the proxy server in accordance with stored ones of the user-defined policies and to take action against suspected spyware in accordance therewith. Additionally, a spyware cleanup module configured to access the spyware policy database and to act on suspected spyware infections within a host coupled to the proxy server in accordance with one or more of the user-defined spyware policies may be included. Among the stored ones of the user-defined spyware policies may be included a spyware signature list for identifying camouflaged spyware files. Among the various modules may be a filter configured to segregate communications according to originating addresses thereof, and/or a filter configured to examine communications originating from a protected network.

These and other features and advantages of the present invention are described further below.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Introduction

Figure 1:
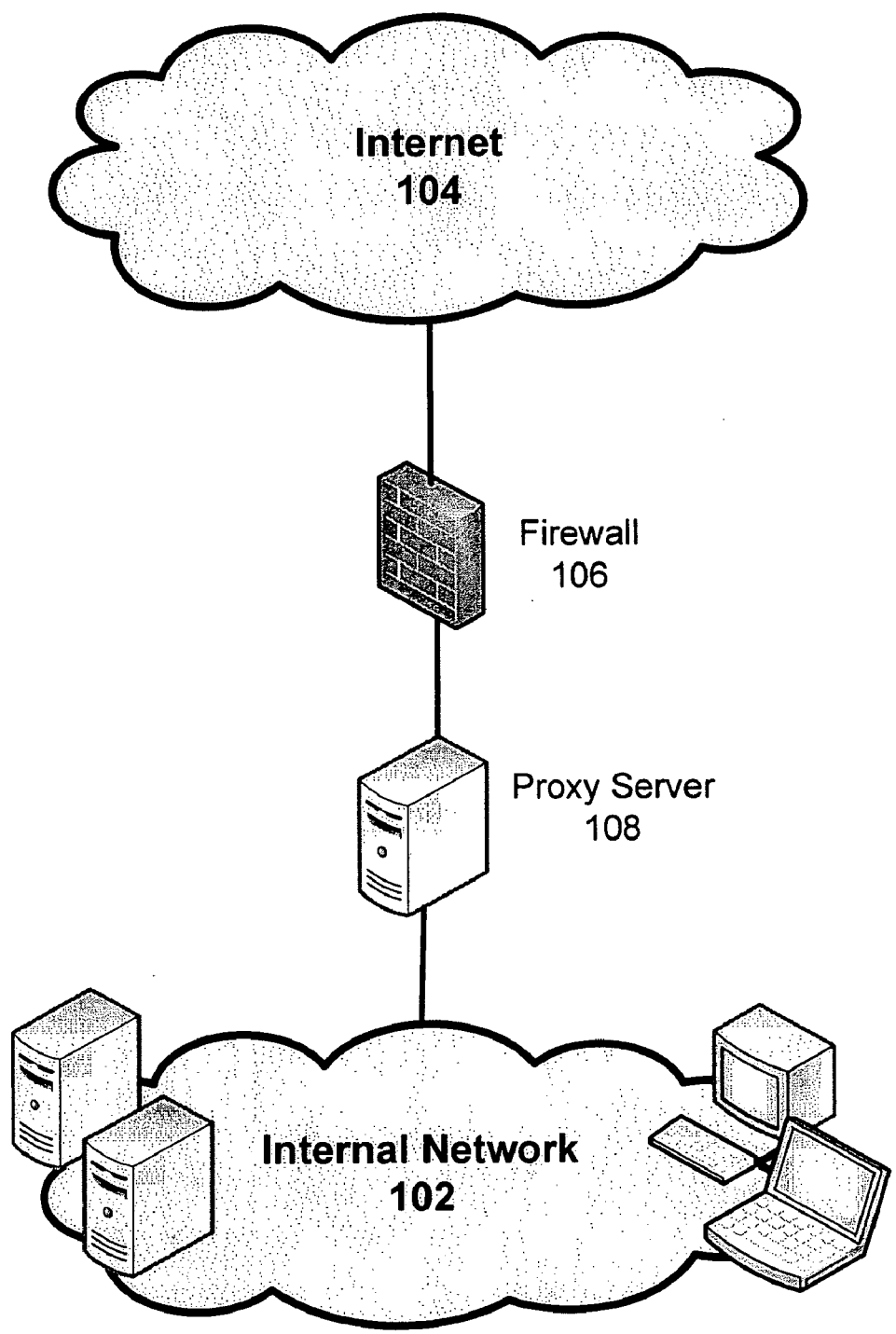
FIG. 1 illustrates a proxy server situated between the Internet and a private network on which embodiments of the present invention may be implemented.

Methods and apparatus for blocking unwanted software from becoming downloaded and installed on PCs are disclosed herein. Unwanted software refers to undesirable code that is covertly downloaded, for example to perform some malicious activity. Such unwanted software downloads include spyware that covertly monitors PC activity, and reports the results to some outside entity. Although the present system will be discussed with reference to various illustrated examples, these examples should not be read to limit the broader spirit and scope of the present invention. For example, the examples presented herein describe various modules, such as a spyware detection and cleanup module, which are but one embodiment of the present invention.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Example System Overview

An environment in which various embodiments of the present invention can be implemented is now described with reference to FIG. 1. FIG. 1 shows one configuration by which an internal network 102 can be connected to the Internet 104. The internal network 102 can represent a private network—such as a corporate network—of any size or complexity. The internal network 102 can include servers, routers, switches, hubs, wireless access points, printers, faxes, or any other kind of network peripheral device. The internal network 102 can be a sub-network, or the entire network of an enterprise.

One security tool that can be implemented between the Internet 104 and the internal network 102 is a firewall 106. The firewall 106 allows or blocks traffic into and out of the internal network 102. Firewalls are widely used to give users secure access to the Internet as well as to separate a company's public Web server from its internal network. A firewall can be a stand-alone computer-based device, or may be implemented as a set of computer-readable instructions (software) to be executed by a computer-based device (e.g., a router or server) configured to perform other operations. It can be as simple as a single router that filters out unwanted packets, or it may comprise a combination of routers and servers each performing some type of firewall processing.

Another layer of security positioned between the internal network 102 and the Internet is a proxy server 108, also referred to as a proxy. A proxy is any entity that breaks the connection between a sender and a receiver. The proxy server 108 can be used for address translation, caching, and other gateway functions. In one embodiment, the firewall 106 is implemented using the proxy server 108.

Several embodiments of the present invention are described as being implemented in the proxy server 108. However, other embodiments of the present invention can be implemented in the firewall 106, some other network element such as a router or a bridge, or even on individual PCs connected to the internal network 102.

Several embodiments and configurations of proxy server 108 are now described with reference to FIG. 2. The proxy sever 108 illustrated in FIG. 2 only shows those aspects of the proxy server 108 that relate to spyware blocking. The proxy server 108 can have numerous other functionalities, such as network address translation and virus filtering, that are not pictured in FIG. 2 and are not discussed herein.

In one embodiment of the present invention, spyware blocking is handled by the proxy server 108 using policies to manage rules for handling spyware. The policies can be stored in a spyware policy database 206, and edited using a convenient user interface such as a spyware policy editor 208. These modules will be described in more detail in relation to other aspects of the proxy server 108.

In one embodiment, traffic from the Internet 104 is passed through a Uniform Resource Locator (URL) filter 202. The URL filter 202 is configured to block the access of installers from certain websites to the internal network 102. In this manner, the URL filter 202 can block downloads from websites deemed undesirable.

The functioning of the URL filter 202 is controlled, in one embodiment, by one aspect of a spyware policy. Such a spyware policy can be retrieved by the URL filter 202 from the spyware policy database 206. One aspect of the policy may be web access. The spyware policy editor 208 can provide a graphical editing interface (e.g., for a network administrator connected via a PC or other communication element) having a portion thereof that allows an administrator to edit or create a URL filter sub-policy.

In a further embodiment, the spyware policy editor 208 allows the authoring of web access rules. A rule can identify a communication—e.g., by source and/or destination—and an action (such as deny or allow) associated with the communication. Other details, such as the time of the communication may also be specified by the web access rules.

The spyware policy editor 208 allows the creation of lists to simplify the authoring of web access rules. In one embodiment, both white and black lists are allowed. A white list can contain the URLs of sites that are known not to contain spyware, such as sites that are authorized for users of network 102 to visit and interact with (e.g., even if such interactions involve software downloads). Conversely, a blacklist can contain the URLs of known spyware sites. Web access rules of varying strictness can thus be included in a spyware policy.

In one embodiment, the web access rules of the policy only block downloads of certain file types. For example, spyware is often sent as executable files—such as those having .EXE (executable), .COM (command), or .DLL (dynamic linked library) file extensions—or active content files—such as those having .CAB (cabinet) and .OCX (OLE control extension) file extensions. One web access rule may prohibit installer access for such file extensions from uncategorized sites, while another rule may block all downloads from blacklisted sites, and yet another rule may pass downloads from all white listed sites.

Thus, the functioning of the URL filter 202 is controlled by the spyware policy specified by the network administrator and applied thereto at proxy 108. The convenient graphical interface provided by the spyware policy editor 208 makes it easy for the administrator to draft web access rules as required and have those rules integrated into the policies.

To combat spyware that may be disguised in some fashion to pass through URL scanner 202, proxy server 108 employs additional tools. For example, to prevent downloads of files that may have file extensions camouflaged to disguise their true nature, the proxy server 108 includes a spyware scanner 204. The spyware scanner 204 is configured to scan incoming files for spyware signatures that cannot be hidden (e.g., through changes in file extensions) and take action according to user-defined spyware policies. To better understand this concept, consider that spyware, by its nature, contains certain patterns that spyware scanner 204 can read in order to identify the true nature of the associated file. For example, a .CAB file will include a header having a certain format. In one embodiment, a spyware policy stored in the spyware policy database 206 includes a spyware signature list accessible by the spyware scanner 204 and that list may include information regarding known characteristics of spyware headers and the like. Now, when the spyware scanner 204 accesses the spyware signatures specified by one or more policies, scans the files being downloaded from the Internet 104, and compares the scanned information with the spyware signature information, then when a spyware signature is detected in the file being downloaded, the download may be blocked.

In one embodiment, the spyware scanner 204 can also access the spyware policy database 206 to edit and update the spyware policy as appropriate. In one embodiment, the spyware policy editor 208 provides an option to the administrator to enable automatic blacklist updating from the spyware scanner 204. If this option is enabled, the spyware scanner updates the URL blacklist used by the URL filter 202 to include the source of the file containing the detected spyware signature.

The proxy server 108 may also be configured to perform spyware cleaning activities in conjunction with spyware cleaning software. For example, in one embodiment of the present invention the proxy server 108 includes a spyware detection module 210 configured to scan outbound traffic from the internal network 102 to the Internet 104 and intercept attempts by installed spyware to "phone home". As described above, spyware functions by monitoring a user's activity on a personal computer or other host and then reporting the observed activity back to some outside entity. This reporting back is often referred to as the spyware "phoning home". To prevent this form of eavesdropping, the spyware detection module 210 is configured to scan for such phone home communications, for example according to one or more user-defined policies stored in the spyware policy database 206. Accessing a black list of known spyware sites, for example, can help the spyware detection module 210 catch spyware phoning home by comparing an address to which an outbound communication is directed with a list of URLs identified as blacklisted sites.

In one embodiment, the spyware detection module 210 can also identify spyware phoning home to previously unknown sites. For example, a first communication from new software to a previously unknown site may be closely scrutinized by the spyware detection module 210. The content of the communication can be examined to determine whether it is consistent with spyware phone home messages and, if so, action taken accordingly. Usually the action will include blocking the communication, but additional activities such as alerting the user and/or an administrator may also be performed. Spyware phone home messages may be identified either by characteristics of the messages or the contents thereof (e.g., as including sensitive information such as passwords and the like, or information extracted from data stores known to include confidential information), as specified by the various policies referred to above.

In one embodiment, when the spyware detection module 210 intercepts a phone home message from spyware installed on a host on the network, spyware detection module 210 uses the destination address of the phone home message to update the web access blacklist used by the URL filter 202. The spyware detection module 210 can be configured to perform such blacklist update automatically via the spyware policy editor 208.

If the spyware detection module intercepts a phone home message from spyware installed on a host on the network, the address of the infected host may be provided to the spyware cleanup module 212. The spyware cleanup module 212 can also access the spyware policy stored in the spyware policy database. The spyware cleanup module 212 can then carry out spyware cleanup according to the options specified in the spyware policy.

In one embodiment, the spyware cleanup module 212 can activate a spyware cleanser software—such as the spyware cleanser provided by Intermute™—stored on a host within the internal network 102. Depending on the action specified in the policy, the spyware cleanup module may first prompt the user of the infected host to inform him or her of the suspected spyware infection and permit the user to decide whether he or she wishes to perform spyware cleansing at that time. Alternatively, spyware cleansing can be performed automatically without user intervention. In some cases, the user may also be prompted to attempt to identify the source of the spyware infection according to his or her best ability.

As described above, the functional operation of the spyware detection module 210 and the spyware cleanup module 212 are controlled, in one embodiment, by a policy stored in the spyware policy database 206. Using the graphical interface provided by the spyware policy editor 208, an administrator can set various options and preferences used by these modules. Furthermore, the administrator can update various lists and rules that also affect the functionality of these modules.

In one embodiment, the spyware policy editor 208 provides a graphical user interface to an administrator accessing the proxy server 108 from a workstation on the internal network 102. The user interface can be configured to allow the administrator to author, save, edit, and apply various policies. A single policy may have numerous sub-policies associated with it. Sub-policies may be separated by graphical tabs or other user interface elements for the convenience of the administrator. For example, a web access rules sub-policy editor may be provided under a corresponding web access page of the user interface. Similarly, other user interface elements may exist for black and white list creation and editing, spyware signature list creating and editing, spyware cleanser specification, and the specification or editing of various other configuration parameters to carry out the functionalities discussed above.

Unwanted Software Blocking

Figure 2:
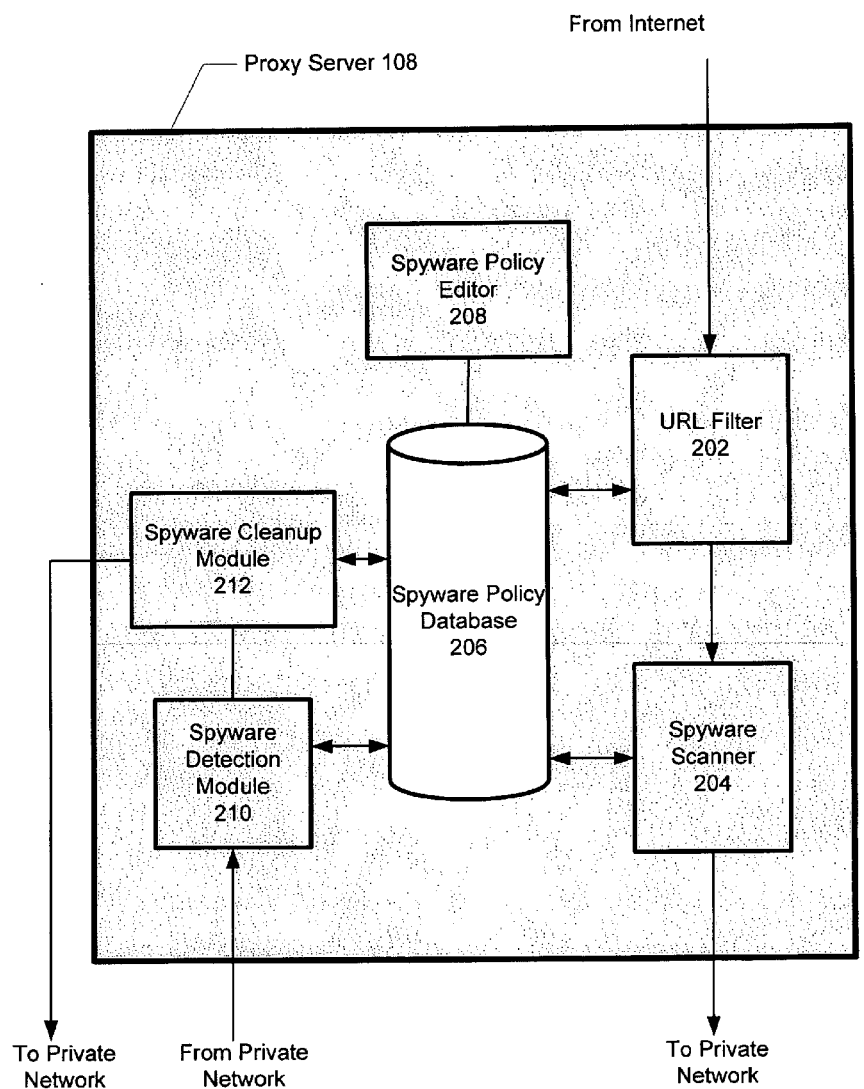
FIG. 2 illustrates a proxy server configured according to one embodiment of the present invention.
Figure 3:
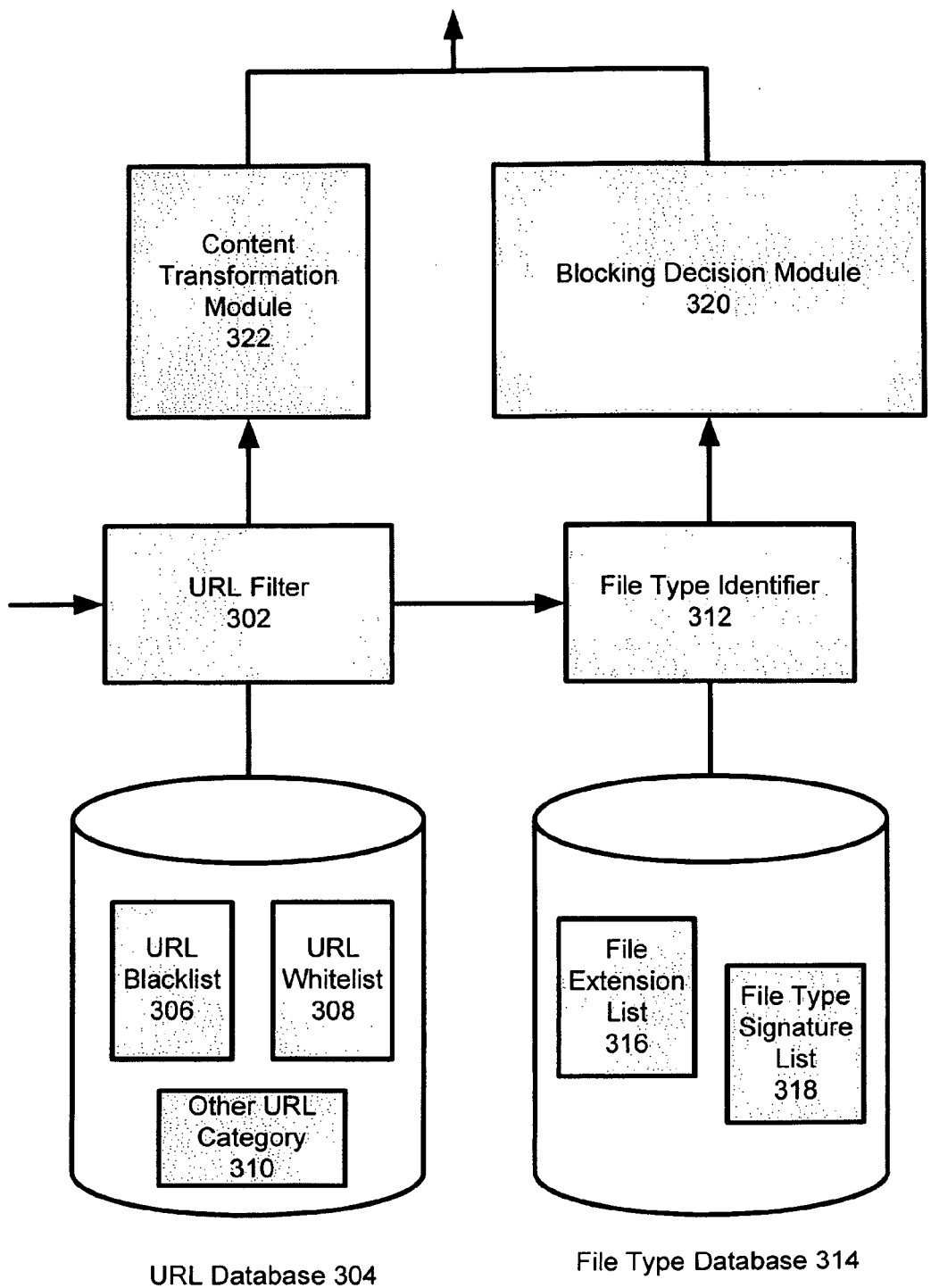
FIG. 3 illustrates a system configured according to one embodiment of the present invention.

FIG. 3 shows another embodiment of a system to block unwanted software downloads. The system shown in FIG. 3 can be implemented in the proxy server 108 shown in FIG. 2, on the firewall shown in FIG. 1, or some other network device such as a router, or a PC connected to the internal network 102.

The traffic from the Internet 104 is still intercepted by a URL filter 302, similar to the URL filter in FIG. 2. The URL filter 302 in FIG. 3 is configured, in one embodiment, to categorize the URL from which a download is arriving at the system. In one embodiment, the URL filter has access to a URL database 304.

The URL database 304 contains URLs organized by category. For example, a set of URLs can be categorized as a URL blacklist 306. Similarly, other URLs are in the URL whitelist 308. The terms "black" and "white" lists are merely descriptive. Content from blacklisted URLs need not be automatically blocked, and content from whitelisted URLs need not be automatically allowed to pass. How such categorizations are used can be implemented and varied in the blocking decision module 320 to be described in detail further below.

Yet other URLs can be in some other category 310, such as "gaming sites." Such a list of Internet gaming sites can be acquired from some third party, or compiled over time. Many other such URL categories are possible, with various descriptive names. However, the name of the category is merely a description. The categories may also be described by numbers, letters, or other labeling methods.

In one embodiment, the URL database 304 is organized as a list of URLs, where each URL has a category associated with it. Uncategorized URLs can be placed in a catchall "unknown" category. The URL database 304 can be implemented as a database structure, but it may be implemented using other structures as well.

Thus, in one embodiment, the URL filter 302 categorizes the URL that originated a download by matching the source URL against the URL database 304 and retrieving the category associated with the source URL. The URL database 304 can be located in the same system or device as the URL filter 302, for example, both can be located in a gateway. However, the URL database 304 need not be collocated with the URL filter 302. In one embodiment, the URL filter 302 may be located on a PC, and the URL database 304 may be located in some other network device, such as a proxy server.

In one embodiment, the traffic from the Internet 104 is also provided to a file type identifier 312. The file type identifier 312 is configured to identify the download by file type. For example, a download may be classified as belonging to the executable file type, or the Microsoft Word file type, or the PDF file type. In one embodiment, the file type identifier has access to a file type database 314.

The file type database 314 can be located in the same system or device as the file type identifier 312, for example, both can be located in a gateway. However, the file type database 314 need not be collocated with the file type identifier 312. In one embodiment, the file type identifier may be located on a PC, and the file type database 314 may be located in some other network device, such as a proxy server.

In one embodiment, the file type database 314 includes a file extension list 316. The file extension list 316 associates file types with file extensions. For example, the .EXE file extension is associated with the executable file type, the .DLL file extension is associated with the dynamic linked library file type, and so on. In one embodiment, the file extension list 316 includes at least the following well-known file extensions: .exe, .com, .dll, .cab, .ocx, .bat, .cmd, .vbs, .vb, .pif, .hlp, .msi, .scr, .wsc, .wsh, .wsf, .hta, .class, .jar, .chm, .cpl, and .zip.

Furthermore, the file type database 314, in one embodiment, also includes a file type signature list 318. The file type signature list 318 includes signatures of various file types and the file types with which they are associated. In one embodiment, the file type identifier 312 scans incoming downloads for signatures appearing on the signature list 318. If a signature is detected, the file type identifier can identify the download as having the file type associated with the detected signature.

In one embodiment, the information collected by the URL filter 302 and the file type identifier is provided to a blocking decision module 320. In one embodiment, the blocking decision module 320 is configured to either block or pass the incoming download. In one embodiment, this decision is based on the information collected by the URL filter 302 and the file type identifier 312.

For example, the blocking decision module can implement a blocking rule to block all .CAB files from URLs on the URL blacklist 306 whether the .CAB file was identified by file extension or by signature. Another blocking rule can block all downloads from non-whitelisted URLs where the file type identified by file extension does not match the file type identified using the signature list 318.

As another example using the "gaming sites" category discussed above, the blocking decision module 320 can be configured to allow executable (.EXE) files to be downloaded from known gaming sites, but not cabinet (.CAB) files. Since most online games require downloading some executable code, a .EXE download does not look very suspicious from a site in this category. However, a .CAB file from a gaming site would highly likely contain unwanted code.

Various other such blocking rules are possible. In one embodiment, the rules implemented by the blocking decision module 320 are derived from a spyware policy discussed further above.

In one embodiment, URL filter 302 is configured to classify not only software downloads, but any delivery mechanism used for downloading software. For example, HTML Web pages can have tags containing links to software downloads, such as object tags. As such, a Web page can be a delivery mechanism for unwanted software downloads.

Thus, in one embodiment, the URL filter 302 also classifies Web pages—and other content delivery mechanisms such as HTML, XML, and other such files—according to the various URL lists and categories in the URL database 304. The received delivery mechanism is then passed to a content transformation module 322. In one embodiment, the content transformation module 322 is configured to strip tags contained in the downloaded file for certain categories of delivery mechanism.

For example, the content transformation module 322 can be configured to strip all object tags from all Web pages downloaded from URLs appearing on the URL blacklist 306. Object tags are tags identifying active content, such as flash animation, in a download file. Removing object tags prevents the download and installation of active content identified in the removed tag.

Similarly, the content transformation module 322 can be configured to strip script tags from Web pages downloaded from URLs categorized as some other URL category 310, such as gaming sites, commerce sites, adult-content sites, and so on. What type of tags to remove from which category of Web pages can be pre-configured in the content transformation module 322, or it can be according to a spyware policy as discussed above.

In one embodiment, the content transformation module 322 also uses information collected by the URL filter 302 in performing the object tag removals. For example, files downloaded from URLs appearing on the URL whitelist 308 can be trusted enough not to have their object tags removed. In such a case, the content transformation module 322 would be configured only to strip object tags from non-whitelisted downloads. Various other such object tag removal rules are possible, and in one embodiment, such rules are part of the spyware policy discussed further above.

Thus, various schemes for implementing unwanted software blocking have been described. In the forgoing description, various specific values and data structures were given names, such as "spyware signature" and "spyware policy database," and various specific modules, such as "file type identifier" and "URL filter" have been described. However, these names are used merely to describe and illustrate various aspects of the present invention, and in no way limit the scope of the present invention.

Furthermore, various modules, such as the blocking decision module 320, in FIG. 3, can be implemented as software or hardware modules, or without dividing their functionalities into modules at all. The present invention is not limited to any modular architecture either in software or in hardware, whether described above or not.

Furthermore, various embodiments of the present invention have been described as being implemented in a proxy server. However, other embodiments of the present invention can be implemented in multiple proxy servers, a router, a gateway device, a personal computer, a host device, or any combination of the above.

What is claimed is:

1. A method, comprising:
    intercepting at a Uniform Resource Locator (URL) filter module of a network device, an attempted download of a file from a URL;
    categorizing by the URL filter module of the network device the URL into a URL category according to a URL database;
    analyzing by a file type identifier module of the network device the file to determine its file type, wherein the file type of the file is determined by detecting one or more of a file type signature in the file and a file extension of the file, and identifying the file type of the file based on one or more of the file type signature detected in the file and the file extension of the file; and
    blocking or not blocking the attempted download according to a decision output of a blocking decision module of the network device which receives as inputs the URL category and the file type, wherein (i) if the URL category indicates a blacklist, the decision output is to block the download, (ii) if the URL category indicates a whitelist, the decision output is to allow the download, otherwise, the URL category specifies a URL content category indicating a type of content provided by the URL, and the decision output is based on whether files of said file type are permitted for URLs in the URL content category.

2. The method of claim 1, wherein the detected file extension is one of a .exe, .com, .dll, .cab, .ocx, .bat, .cmd, .vbs, .vb, .pif, .hlp, .msi, .scr, .wsc, .wsh, .wsf, .hta, .class, .jar, .chm, .cpl, and .zip file extension.

3. The method of claim 1, wherein the URL database is stored remotely.

4. The method of claim 1, further comprising scanning, by a spyware detection module, outgoing communications for spyware signatures.

5. A network device, comprising:
    a processor;
    a storage device connected to the processor; and
    a set of instructions on the storage device that are executable by the processor, including:
    a Uniform Resource Locator (URL) filter software subroutine configured to intercept an attempted download of a file from a URL, and categorize the URL into a URL category according to a URL database;
    a file type identifier software subroutine configured to analyze the file to determine its file type, wherein the file type identifier software subroutine is further configured to determine the file type of the file by detecting one or more of a file type signature in the file and a file extension of the file, and identifying the file type of the file based on one or more of the file type signature detected in the file and the file extension of the file; and
    a blocking decision software subroutine configured to block or not block the attempted download according to a decision output of the blocking decision software subroutine which receives as inputs the URL category and the file type, wherein (i) if the URL category indicates a blacklist, the decision output is to block the download, (ii) if the URL category indicates a whitelist, the decision output is to allow the download, otherwise, the URL category specifies a URL content category indicating a type of content provided by the URL, and the decision output is based on whether files of said file type are permitted for URLs in the URL content category.

6. The network device of claim 5, wherein the detected file extension is one of a .exe, .com, .dll, .cab, or .ocx file extension.

7. The network device of claim 5, further comprising a spyware detection software subroutine configured to scan outgoing communications for spyware signatures.

8. A non-transitory machine-readable storage medium, comprising:
    first software instructions that, when executed by a processor, cause the processor to intercept an attempted download of a file from a Uniform Resource Locator (URL);
    second software instructions that, when executed by the processor, cause the processor to categorize the URL into a URL category according to a URL database;
    third software instructions that, when executed by the processor, cause the processor to analyze the file to determine its file type, wherein the file type of the file is determined by detecting one or more of a file type signature in the file and a file extension of the file, and identifying the file type of the file based on one or more of the file type signature detected in the file and the file extension of the file; and
    fourth software instructions that, when executed by the processor, cause the processor to block or not block the attempted download according to a decision output of a blocking rule based on the URL category and the file type, wherein (i) if the URL category indicates a blacklist, the decision output is to block the download, (ii) if the URL category indicates a whitelist, the decision output is to allow the download, otherwise, the URL category specifies a URL content category indicating a type of content provided by the URL, and the decision output is based on whether files of said file type are permitted for URLs in the URL content category.

9. The non-transitory machine-readable storage medium of claim 8, wherein the detected file extension is one of a .exe, .com, .dll, .cab, or .ocx file extension.

10. The non-transitory machine-readable storage medium of claim 8, further comprising fifth software instructions for detecting outbound communications for spyware signatures.

* * * * *